United States Patent
Ohm et al.

(10) Patent No.: US 9,350,442 B2
(45) Date of Patent: May 24, 2016

(54) SYSTEM ARCHITECTURE FOR PROVIDING COMMUNICATIONS IN A WIRELESS COMMUNICATION NETWORK

(75) Inventors: Michael Ohm, Stuttgart (DE); Thorsten Wild, Stuttgart (DE); Michael Schmidt, Stuttgart (DE)

(73) Assignee: Alcatel Lucent, Boulogne-Billancourt (FR)

( * ) Notice: Subject to any disclaimer, the term of this patent is extended or adjusted under 35 U.S.C. 154(b) by 846 days.

(21) Appl. No.: 13/123,464

(22) PCT Filed: Jul. 23, 2009

(86) PCT No.: PCT/EP2009/059463
§ 371 (c)(1),
(2), (4) Date: Aug. 8, 2011

(87) PCT Pub. No.: WO2010/025996
PCT Pub. Date: Mar. 11, 2010

(65) Prior Publication Data
US 2012/0281672 A1 Nov. 8, 2012

(30) Foreign Application Priority Data

Sep. 4, 2008 (EP) .................... 08290831
Nov. 10, 2008 (EP) .................... 08291050
Jun. 12, 2009 (EP) .................... 09290442

(51) Int. Cl.
*H04B 7/185* (2006.01)
*H04B 7/26* (2006.01)
(52) U.S. Cl.
CPC ............ *H04B 7/18506* (2013.01); *H04B 7/185* (2013.01); *H04B 7/26* (2013.01)

(58) Field of Classification Search
None
See application file for complete search history.

(56) References Cited

U.S. PATENT DOCUMENTS

| 5,515,378 | A  | * | 5/1996 | Roy, III et al. .................. 370/334 |
| 6,275,187 | B1 | * | 8/2001 | Ross et al. .................. 342/372 |
| 6,377,802 | B1 | * | 4/2002 | McKenna et al. ............. 455/430 |
| 6,392,595 | B1 |   | 5/2002 | Katz et al. |
| 6,426,720 | B1 | * | 7/2002 | Ross et al. .................... 342/372 |

(Continued)

FOREIGN PATENT DOCUMENTS

| JP | 2007-082075 A | 3/2007 |
| WO | WO 99/45609 A1 | 9/1999 |

(Continued)

OTHER PUBLICATIONS

International Search Report for PCT/EP2009/059463 dated Feb. 4, 2010.

(Continued)

*Primary Examiner* — Chirag Shah
*Assistant Examiner* — Suk Jin Kang
(74) *Attorney, Agent, or Firm* — Fay Sharpe LLP

(57) ABSTRACT

A method for performing communications in a wireless communication network includes receiving mobility information about at least one moving mobile station in a mobility server of the wireless communications network, using the mobility information from the mobility server for calculating antenna weights to be applied to antenna elements of an antenna array for steering a beam generated by the antenna array to the moving mobile station preferably using space-division multiple access, SDMA. Embodiments also relate to a base station, to a mobile station, and to a wireless communication network.

18 Claims, 1 Drawing Sheet

(56) References Cited

U.S. PATENT DOCUMENTS

| | | | |
|---|---|---|---|
| 6,678,253 B1* | 1/2004 | Heath et al. | 370/265 |
| 6,721,567 B1* | 4/2004 | Wang et al. | 455/440 |
| 6,757,265 B1* | 6/2004 | Sebastian et al. | 370/319 |
| 7,629,927 B2* | 12/2009 | Ishizu et al. | 342/383 |
| 2001/0003443 A1* | 6/2001 | Velazquez et al. | 342/367 |
| 2003/0169720 A1* | 9/2003 | Sebastian et al. | 370/342 |
| 2004/0104839 A1* | 6/2004 | Velazquez et al. | 342/357.31 |
| 2004/0203395 A1* | 10/2004 | Chizhik et al. | 455/63.1 |
| 2005/0025099 A1* | 2/2005 | Heath et al. | 370/334 |
| 2005/0037756 A1* | 2/2005 | Yaguchi et al. | 455/436 |
| 2005/0070285 A1* | 3/2005 | Goransson | 455/436 |
| 2005/0197767 A1* | 9/2005 | Nortrup | 701/209 |
| 2007/0042772 A1* | 2/2007 | Salkini et al. | 455/431 |
| 2007/0057843 A1* | 3/2007 | Chang et al. | 342/368 |
| 2007/0142050 A1* | 6/2007 | Handforth et al. | 455/436 |
| 2007/0160047 A1* | 7/2007 | Park et al. | 370/390 |
| 2007/0232322 A1* | 10/2007 | Jagadeesan et al. | 455/456.1 |
| 2007/0249402 A1* | 10/2007 | Dong et al. | 455/562.1 |
| 2008/0130585 A1* | 6/2008 | Park et al. | 370/332 |
| 2008/0151817 A1* | 6/2008 | Fitchett et al. | 370/329 |
| 2008/0181180 A1* | 7/2008 | Karaoguz | 370/331 |
| 2008/0207223 A1* | 8/2008 | Kall et al. | 455/456.1 |
| 2008/0240029 A1 | 10/2008 | Lynch et al. | |
| 2008/0242305 A1* | 10/2008 | Kahlert et al. | 455/440 |
| 2009/0176475 A1* | 7/2009 | Salkini et al. | 455/404.1 |
| 2009/0203394 A1* | 8/2009 | Shaffer et al. | 455/525 |
| 2009/0325582 A1* | 12/2009 | Jagadeesan et al. | 455/436 |
| 2010/0056148 A1* | 3/2010 | Kellil et al. | 455/436 |
| 2010/0260134 A1* | 10/2010 | Heath et al. | 370/329 |
| 2011/0051832 A1* | 3/2011 | Mergen et al. | 375/267 |
| 2011/0080825 A1* | 4/2011 | Dimou et al. | 370/216 |
| 2012/0020316 A1* | 1/2012 | Dong et al. | 370/329 |
| 2012/0064908 A1* | 3/2012 | Fox et al. | 455/452.2 |
| 2012/0258717 A1* | 10/2012 | Handforth et al. | 455/436 |

FOREIGN PATENT DOCUMENTS

| | | |
|---|---|---|
| WO | WO 03/003614 A1 | 1/2003 |
| WO | WO 2004/023677 A2 | 3/2004 |
| WO | WO 2006/105316 A2 | 10/2006 |

OTHER PUBLICATIONS

European Search Report dated May 4, 2010 for Appl. No. EP 09 29 0442.

* cited by examiner

SYSTEM ARCHITECTURE FOR PROVIDING COMMUNICATIONS IN A WIRELESS COMMUNICATION NETWORK

This application is a U.S. National Filing of PCT/EP2009/059463, filed Jul. 23, 2009, which is based on and claims priority to EP 08290831.0 filed Sep. 4, 2008, EP 08291050.6, filed Nov. 10, 2008, and, 09290442.4 filed Jun. 12, 2009, all of which are incorporated herein by reference in their entirely.

The invention is based on the priority applications EP 08 290 831.0, EP 08 291 050.6 and EP 09 290 442.4 which are hereby incorporated by reference.

TECHNICAL FIELD

The invention relates to a method for performing communications in a wireless communication network, to a base station, to a mobile station, and to a wireless communication network.

BACKGROUND OF THE INVENTION

This section introduces aspects that may be helpful in facilitating a better understanding of the invention. Accordingly, the statements of this section are to be read in this light and are not to be understood as admissions about what is in the prior art or what is not in the prior art.

For efficiently providing broadband communication services to very high mobility passengers (e.g. in airplanes, trains, etc.) those passengers should be allowed to use their own regular communication devices (phones, laptop cards, etc.). Spectrum efficiency in the communication from a base station to a mobile station and vice versa should be high to offer real broadband services and to keep the number of base stations and/or required transmission resources (e.g. licensed spectrum) low while serving a large number of high-velocity vehicles (e.g. airplanes, trains) at the same time.

Moreover, it is preferable to reuse standardized hardware constructed for classical cellular mobile communications as much as possible in order to keep production costs low and in order to offer a solution which is separable from existing standards and products of a specific vendor.

Such a system may be a cellular system that uses base station antennas with broad main lobes in the antenna characteristics to cover large portions of a cell. The mobile stations use network coupling in order to connect to an inner pico-cell inside the high mobility transportation object (e.g. airplane, train). This pico-cell can be a multi-standard cell, supporting e.g. GSM, WLAN, UMTS etc. Alternatively or in addition, it is also possible to provide a wire-line (cable) connection to end-user terminals (used by passengers, crew, etc.) inside the high mobility transportation object.

The multiple-access scheme for serving a number of high-velocity vehicles would be a time-division multiple-access (TDMA) scheme, or a frequency-division multiple-access (FDMA) scheme, or a combination of both. However, these multiple-access schemes do not account for the spatial separation of the served high-velocity vehicles within one cell. Thus, these schemes do not reach the theoretically possible spectrum efficiency.

Moreover, existing standard mobile communication hardware and software has to be modified in order to cope with the very high velocities of moving mobile stations in trains and airplanes. The drawback here is that separability of such a mobility solution may not be given anymore. This means e.g. that the development of such a high-mobility add-on solution and of the standard cellular solution cannot be separated which may lead to increased cost and ties the high-mobility solution to a particular product for a particular mobile communication standard.

It is an object of the invention to provide: a method, a base station, a mobile station, and a communications system allowing for provisioning of efficient mobile communications.

SUMMARY OF THE INVENTION

One aspect of the invention is implemented in a method for performing communications in a wireless communication network, comprising: receiving mobility information about at least one moving mobile station in a mobility server of the wireless communications network; and, in a base station, using the mobility information from the mobility server for calculating antenna weights to be applied to antenna elements of an antenna array, for steering a beam generated by the antenna array to the moving mobile station, preferably using space-division multiple access, SDMA.

The inventors propose to make use of the spatial separation of the served moving mobile stations by using beamforming of the antenna array in order to serve different mobile stations, preferably using SDMA when more than one mobile station is located in the same cell (=sector). Such an active antenna array may comprise a number of N transceivers and N closely-spaced (e.g. lambda/2) antenna elements. A planar arrangement of antenna elements in both vertical and horizontal direction may allow for two-dimensional beamforming in two out of the three spherical coordinates, i.e. in the azimuth and elevation direction, whereas conventional (one-dimensional) beamforming is restricted to only one spherical coordinate (azimuth), as conventional antenna element arrays are typically vertically stacked, such that complex antenna weights can only be applied to a complete stack of vertical antenna elements. The two-dimension beamforming arrangement may be used when the mobile stations are distributed over a three-dimensional space, as is the case with high-velocity vehicles such as airplanes. Of course, it is also possible to use antenna arrays which are only adapted to perform (conventional) one-dimensional beamforming.

The antenna weight vector for this operation typically has as many elements as there are antenna elements in the active array, resulting in one IQ (In-phase/quadrature) time series per antenna array. The weight vector is then calculated based on the mobility information from the mobility server and can e.g. correspond to the steering vector which steers the main lobe of the beam towards the azimuth and possibly also the elevation direction of the mobile station, in case the mobile station is an airplane. In such a way, one or more conventional base station sector(=cell) signals may be mapped to one or more active antenna arrays, thus allowing for large flexibility.

In one variant, the method further comprises: transferring the mobility information from a mobility client located at the mobile station to the mobility server. The mobility client obtains mobility information, e.g. GPS data (coordinates, velocity and direction of movement) from the high-velocity vehicle or alternatively calculates the position of the high-velocity vehicle based on cell-Ids, triangulation and velocity estimates, e.g. based on channel estimation. The mobility client may obtain the mobility information, e.g. GPS data (coordinates, velocity and direction of movement), from devices devised for this purpose within the high-velocity vehicle, e.g. from a GPS receiver. This mobility information is then transferred to the mobility server, which may be a central device adapted to centrally store and manage the mobility data for at least some, preferably all mobile stations in the communication network and also stores the position of at least some, preferably all of the base stations of the communication network. The use of a centralized server for storing mobility information of all the mobile stations in the network is possible as the overall number of high-mobility mobile stations (e.g. airplanes or trains being adapted for moving at velocities of 250 km/h or more) is typically low. In a wireless network with "classical" user terminals, the number of end user terminals may be too large to store the mobility information about all the mobile terminals in a single mobile server.

The mobility server may additionally handle the handover of mobile stations between different cells of the same or of different base stations. For this purpose, the mobility server may predict a handover event of a moving mobile station to a new target cell of a base station and trigger the steering of a beam of an antenna array of the new target cell to the moving mobile station to be handed over to the new target cell. This will allow to use standard air interfaces transparently, as also synchronization and pilot signals (which are typically transmitted omni-directional) can now be beamformed, allowing a large range of extension of the method as described herein. It will be understood that even if no beamforming is performed in the network, handover predictions of the mobility server may be useful, as, e.g., additional transmission resources in the handover target cell may be reserved.

In one improvement, the mobility server uses information about the location of the base stations of the communications network for predicting the handover event. As stated above, the mobility server may be a centralized device of the network which has access to location information about all the base stations within the network. However, one skilled in the art will appreciate that it may also be possible to provide a plurality of mobility servers, for example one in each base station, the information about the location of the other base stations being provided to the different mobility servers e.g. during installation of the network. It will be appreciated that in the latter case, for predicting a handover event between different cells of the same base station, the mobility server may only require knowledge of the position of the base station where it is located. Also, the location information of a plurality, even of all base station sites may be transferred to the mobility client, which thus can use this "cached" knowledge for performing e.g. Doppler compensation etc.

In another variant, the method further comprises: performing Doppler compensation of signals transmitted over an air interface between the base station and the moving mobile station. In case that the mobile stations move at high velocities, as is the case with trains and airplanes. Doppler compensation (in the forward link) or Doppler pre-compensation (in the backward link) is of advantage for ensuring that the signal compensated for the Doppler shift can be processed by standard base station/mobile station equipment. For a line-of-sight (LOS) channel (occurring e.g. in airplanes), the Doppler shift will typically be a discrete Doppler shift which can be removed by a complex multiplication using digital signal processing. The Doppler shift can be calculated in the mobile station based on the mobility information of the mobility client and on the information about the position of the respective base station, being obtained from the mobility server. Alternatively, these operations may be performed on the side of the base station, e.g. in a beamforming processor (see below).

It will be understood that the method as described above may be implemented in a computer program product, the latter being devised in a suitable software or hardware, in particular a field programmable gate array (FPGA) or an application-specific integrated circuit (ASIC) or in a digital signal processor (DSP).

A further aspect of the invention is implemented in a base station for a wireless telecommunication system, comprising: at least one antenna array, preferably for performing space-division multiple access. SDMA, a beamforming unit adapted to receive mobility information about at least one moving mobile station from a mobility server, the beamforming unit being further adapted to calculate antenna weights to be applied to antenna elements of the antenna array for steering a beam generated by the antenna array to the moving mobile station using the mobility information.

The beamforming unit/processor may comprise an interface which obtains digital time domain IQ samples per antenna port from/to a standardized hardware of the base station, e.g. using the CPRI (Common public radio interface) specification which is a specification for the internal broadband interface of radio base stations between a Radio Equipment Control (REC) and a Radio Equipment (RE). The IQ samples will be weighted by the beamforming processor and mapped to an active antenna array. The weight vector for this operation may have as many elements as there are antenna elements in the active array, resulting in one IQ time series per antenna array.

The beamforming unit may be further adapted for using the input from multiple sectors of a standard base station hardware (e.g. LTE eNodeB), being typically configured as a single Transmitter (Tx) antenna system. In case that the antenna array has cross-polarized elements, the system may be configured as a dual Tx antenna system mapping one antenna element to one polarization direction. In any case, signals of multiple sectors of the base station hardware, each with their own corresponding weight vectors, can be mapped to one or to a plurality of active arrays, thus allowing for large flexibility.

Although typically the mobility server is devised as a centralized entity within the communications network, the mobility server may also be located in the base station, as for certain applications, it may be advisable to have a plurality of mobility servers, which may be sharing information about the location of the base stations, and possibly also mobility information of the mobile stations e.g. via a common core (IP) network.

In another embodiment, the beamforming unit is separable from the base station and preferably located at an interface between the at least one antenna array and a standardized baseband signal generating component for generating a baseband signal. In particular, the beamforming unit may be an add-on component (consisting of hardware and/or software—e.g. an FPGA board) being connected to a slot or other type of interface of the standardized signal generating component. The standardized component may be compatible to a commonly used telecommunications standard, such as the LTE standard, the standard equipment being an eNodeB in this case. The interface which is used for communicating with the beamforming unit may for example be an interface according to the CPRI (Common public radio interface) specification, or any other suitable radio interface.

Another aspect of the invention is implemented in a mobile station for a wireless communication system, comprising: a mobility client adapted to retrieve mobility information about the mobile station, the mobile station being adapted to transfer the mobility information to a base station of the wireless communication network for storing the mobility information in a mobility server. The mobility client may obtain mobility data in the form of GPS data (coordinates, velocity and direction of movement) from the high velocity vehicle (e.g. train/ airplane). Alternatively, the mobility client may calculate the position based on cell-Ids, triangulation and velocity estimates, e.g. based on channel estimation. The mobility information is then transferred to the mobility server, which may either be part of the base station or located elsewhere in the mobile communication system, for example as a central unit which stores and manages the (volatile) mobility data of the mobile stations in the communication network and also stores the position of the base stations of the communications network. As is the case with the beamforming unit, the mobility client may also be devised as a component being separable from the mobile station.

In one embodiment, the mobile station comprises a physical layer extension component, adapted to perform Doppler compensation of signals transmitted from the mobile station to the base station and/or from the base station to the mobile station. The UE (user equipment)-PHY extension can be used in order to perform Doppler compensation (in the forward link) or Doppler pre-compensation (in the backward link). For a line-of sight (LOS) channel (occurring e.g. in airplanes), the Doppler shift will typically be a discrete Doppler shift which can be removed by digital signal processing, e.g. using complex element-wise multiplications of the time-domain samples with a continuously phase-rotating factor. Another option would be to implement the Doppler compensation in an RF-in/RF-out device by introducing a controllable additional Doppler-shift in the up/down-conversion. The Doppler shift may be calculated in the physical layer extension component based on the mobility information from the mobility client and the position of the base station which currently serves the mobile station, the latter being obtained from the mobility server or being stored locally in the mobile station. Storing position information of all the base stations of the network in each mobile station may be possible due to the relatively low number of base stations required for the present applications.

In one improvement, the physical layer extension component is separable from the mobile station and preferably arranged at an interface between an RF transceiver of the mobile station and a standardized processing component for processing a baseband signal. As is the case with the beamforming unit of the base station, the physical extension may be devised as a (physically) separable component of the mobile station, preferably being located at a standard interface, e.g. according to the CPRI specification, thus allowing for a transparent solution. Alternatively, it is also possible to deploy the physical extension as an RF in-RF out device, the interface in this case being the RF signal transmitted in an RF cable, viz. the RF cable connection itself. It will be understood that even if no beamforming is performed in the network, handover predictions of the mobility server may be useful in the sense that e.g. additional transmission resources may be reserved in the handover target cell or handover commands may be issued based on geographical data instead of using measurements as in conventional wireless networks.

A further aspect relates to a wireless communication network comprising at least one base station as described above and at least one mobile station as described above, the wireless communication system further comprising a mobility server for storing mobility information about the at least one, preferably about each mobile station of the network. It will be understood that the mobility server may be devised as part of a base station. However, the mobility server may in particular be implemented as a centralised server connected to the base station—and to further base stations—via a core network of the wireless communication system. In this way, a centralized entity for providing mobility information to the mobility clients can be provided.

Yet another aspect is implemented in a method for performing communications in a wireless communication network, the method comprising: transferring mobility information from a plurality of mobility clients located at respective mobile stations of the network to a mobility server arranged at a fixed location in the network, storing the mobility information of the plurality of mobile stations in the mobility server; and using the mobility information of the mobility server for predicting a handover event of at least one moving mobile station to a new target cell. Even if no beamforming techniques are applied in the network, handover predictions by the mobility server may be used e.g. for reserving additional transmission resources for the mobile station which is to be handed over to the new target cell or issuing handover commands based on geographical data instead of using measurements as in conventional wireless networks.

Further features and advantages are stated in the following description of exemplary embodiments, with reference to the figures of the drawing, which shows significant details, and are defined by the claims. The individual features can be implemented individually by themselves, or several of them can be implemented in any desired combination.

BRIEF DESCRIPTION OF THE DRAWINGS

Exemplary embodiments are shown in the diagrammatic drawing and are explained in the description below. The following are shown.

DETAILED DESCRIPTION OF PREFERRED EMBODIMENTS

Figure 1:
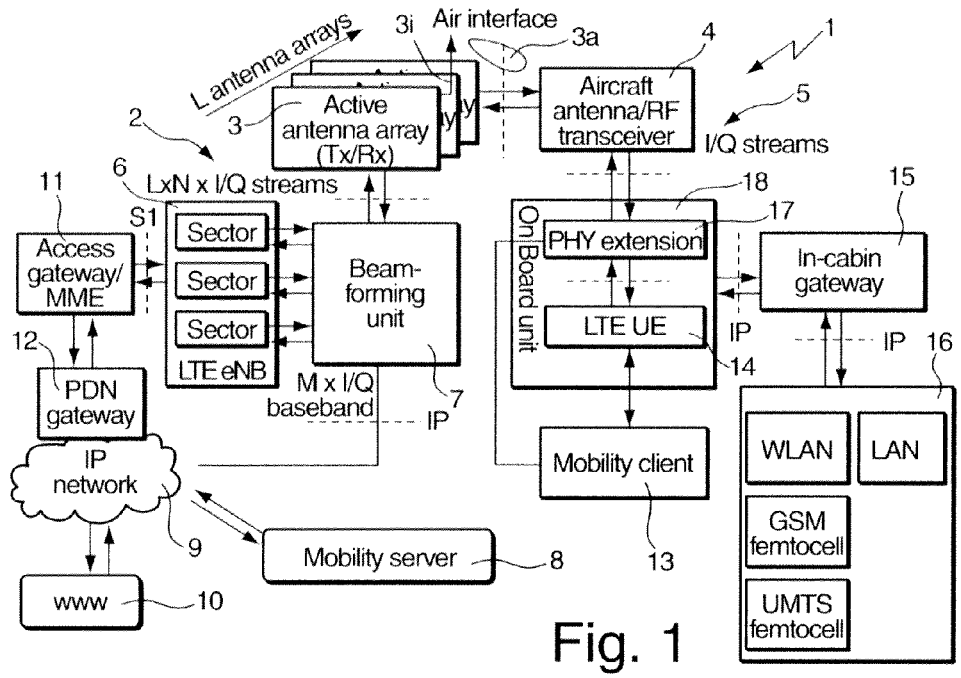
FIG. 1 shows a block diagram of a first embodiment of a communication network according to the invention, ensuring separability.

FIG. 1 shows a schematic block diagram of a communication network 1, comprising a base station 2 with a number L of antenna arrays 3 for radio communication over the air to an antenna arranged in an RF transceiver 4 of a mobile station 5, being located in a vehicle moving at high speed, being and aircraft in the present example.

The base station 2 comprises a standardized baseband signal generating equipment 6 for generating a baseband I/O signal, the standard equipment 6 being for example implemented as an eNodeB of the LTE (long-term evolution) standard. One skilled in the art will appreciate that the equipment 6 used for generating the baseband signal may alternatively be devised to be in accordance with another commonly used telecommunications standard, for example in accordance with the UMTS standard.

Typically, the base station 2 uses a time-division multiple-access (TDMA) scheme, a frequency-division multiple-access (FDMA) scheme, or a combination of both as a multiple-access scheme for serving a number of mobile stations 5 of different sectors. According to the commonly used radio standard, each sector served by the equipment 6 corresponds to one cell defined by one of the active antenna arrays 3.

However, these multiple-access schemes do not account for the spatial separation of the served mobile stations 5 within one cell. As the antenna array 3 comprises a plurality of antenna elements $3i$ (only one being represented in FIG. 1 for the sake of simplicity), beamforming may be performed with each antenna array 3, thus enabling space division multiple access (SDMA) within the cells of the base station 2. For enabling dynamical beamforming, a beamforming unit 7, also being referred to as a beamforming processor in the following, is located at an interface between the active antenna arrays 3 and the standard equipment 6, the interface being in compliance e.g. with the CPRI standard.

The beamforming processor 7 is adapted for using the input from multiple sectors of the standard hardware 6 (e.g. LTE eNodeB), which is configured as a single Tx antenna system in the present example. However, one skilled in the art will appreciated that alternatively, the standard equipment 6 may be configured as a dual Tx antenna system, in case that the antenna arrays 3 have cross-polarized antenna elements, thus mapping one antenna to one polarization direction. In any case, the IQ samples of the broadband signal will be weighted by the beamforming processor 7 and mapped to an active antenna array 3. The weight vector for this operation will have as many elements as there are antenna elements $3i$ in the active array (e.g. N elements per array), resulting in one IQ time series per antenna array 3.

For calculating the antenna weight vector, the beamforming unit 7 receives mobility information, in particular about a position, velocity, or direction of movement of the mobile station 5 to be served by the base station 2 from a mobility server 8, the latter being located in a core (IP) network 9 of the communication network 1, which may have a connection to the internet 10. For enabling the communication, the beamforming processor 7 may comprise a further interface for allowing direct access to the IP network 9. In contrast thereto, the standard radio control equipment (REC) 6 of the base station 2 is connected to the IP network 9 via an access gateway 11, being for instance a Mobility Management Entity (MME) according to the LTE standard, and via a Packet Data Network (PDN) Gateway 12, also being in accordance with the LTE standard.

The mobility data obtained from the mobility server 8 may be used to calculate e.g. the steering vector which steers the main lobe of a beam 3a of the antenna array 3 towards the elevation and azimuth direction of the mobile station 5. In this case, the antenna arrays 3 may be implemented as active arrays which comprise N transceivers and N closely spaced (e.g. lambda/2) antenna elements, as such a planar arrangement of antenna elements in both the vertical and horizontal direction allows for two-dimensional beamforming, thus allowing steering of the beam both in the elevation and azimuth direction of a spherical coordinate system. In this way, a single sector of the standard equipment 6, having its own corresponding weight vector, can be mapped on a single active array 3. Alternatively, a plurality of sectors of the standard equipment 6 may be mapped to one and the same antenna array 3. In the latter case, each of the sectors may be mapped to a corresponding beam generated by the antenna array 3, thus enabling space division multiple access (SDMA).

The mobility information used for the beamforming is provided to the mobility server 8 from a mobility client 13 located at the mobile station 5. The mobility client 13 obtains the mobility information (coordinates, velocity and direction of movement) from a GPS receiver of the airplane or another suitable device devised in the high-velocity vehicle, or alternatively calculates the position based on cell-Ids, triangulation and velocity estimates, e.g. based on channel estimation. The mobility client 13 may be connected to a standardized processing component 14 for processing the baseband signal received from the RF transceiver 4, converting it to IP data, and providing it to an in-cabin gateway 15 which allows for distribution of the IP data to passengers being connected to the gateway 15 via an on-board communications network 16 which may be of a wireless type, e.g. in compliance with at least one wireless communication standard such as WLAN, GSM, or UMTS. Alternatively or in addition, the communications network 16 may be adapted for performing wire-line communications, for instance implementing a conventional LAN being e.g. in compliance with the Ethernet standard.

The mobility information about the mobile station 5 is then transferred to the mobility server 8 via the air interface, the mobility server 8 in the present example centrally storing and managing the mobility information for all mobile stations 5 in the communication network 1. In addition, the mobility server 8 also stores the position of all the base stations 2 of the communication network 1. One skilled in the art will appreciate that alternatively or in addition, at least some of the base stations 2 may be equipped with a mobility server 8 of their own for handling the communication with the beamforming processor 7. In the latter case, the IP network 9 may be used for exchanging mobility information between the mobility servers of the different base stations.

As the transmission of signals between a ground-based, static system and high-velocity vehicles such as airplanes may induce a Doppler shift of the transmitted signals, a physical layer extension component 17 can be used in the mobile station 5 for performing Doppler compensation (in the forward link) or Doppler pre-compensation (in the backward link). For a line-of sight (LOS) channel (occurring e.g. in airplanes), the Doppler shift will typically be a discrete Doppler shift which can be removed by digital signal processing, e.g. using complex element-wise multiplications of the time-domain samples with a continuously phase-rotating factor. Another option would be to implement the physical layer extension component 17 in an RF-in/RF-out device which may introduce a controllable additional Doppler-shift in the up/down-conversion.

In any case, the physical layer extension component 17 may calculate the Doppler shift based on the mobility information obtained from the mobility client 13 and on the position of the serving base station 2, which may be obtained from the mobility server 8 or stored locally in the mobile station 5 for at least some, preferably all of the base stations of the network 1. The physical layer extension 17 may be arranged together with the processing component 14 in a common on-board unit 18 which may also comprise or may be connected to the mobility client 13. In the example shown in FIG. 1, the physical layer extension 17 is located at an interface, e.g. an CPRI interface, between the RF transceiver 4 of the mobile station 5 and the standardized processing component 14. The physical layer extension 17 may alternatively be deployed e.g. in the form of an RF in-RF out device, the interface being an RF interface in this case. One skilled in the art will appreciate that alternatively, the Doppler compensation may also be performed in the base station 2, for example in the beamforming processor 7.

The mobility server 8 may also be adapted to predict a handover event of a moving mobile station 5 to a new target cell of the base station 2 or of another base station of the communications system 1. For making the prediction, the mobility server 8 uses information about the location of the base stations 2 of the communications network 1 as well as about the current position and direction vector of the mobile station 5 for which the handover is to be performed. The mobility server 8 than triggers the steering of a beam 3a of an antenna array 3 of the new target cell to the moving mobile station 5. Thus, instead of omni-directional transmission of synchronization and pilot signals being used for the handover in conventional systems, in the present system, beamformed signals may be used for performing the handover. However, even if no beamforming or only "conventional" one-dimensional beamforming is performed in the network 1, handover predictions by the mobility server 8 may be useful e.g. for reserving additional transmission resources in the handover target cell or issuing handover commands based on geographical data instead of using measurements as in conventional wireless networks.

It will be appreciated that although in the example of FIG. 1, the mobile stations are located in airplanes for serving the passengers of airplanes, the communication system as described herein may equally well be applied to other high-speed vehicles, e.g. for trains. It will be understood that the communication as described herein may also be performed in case that the served mobile stations are not sufficiently spatially separated so that more than one mobile station in a cell may be served using SDMA. Also, one skilled in the art will appreciate that two-dimensional beamforming is not a prerequisite for serving ground-based or even airborne high-velocity vehicles, i.e. serving such vehicles only with one-dimensional beamforming may be possible as well.

In the example of FIG. 1, the beam-steering unit/processor 7 is devised as an add-on to a known type of base station 2 according to the LTE standard, i.e. the beamforming processor 7 is devised as a separable component such as a FPGA card, which may be (physically) separated from the base station 2. In a similar way, the mobility client 13 and the physical layer extension component 17 are devised as add-on components to a known type of mobile user equipment 14 (e.g. according to the LTE standard), both of them also being separable from the mobile station 5. In such a way, a transparent solution is provided in the communication network 1, allowing to use hardware components of standard base stations and/or mobile stations, providing an overlay architecture to an existing communication system for serving high-mobility passengers.

Figure 2:
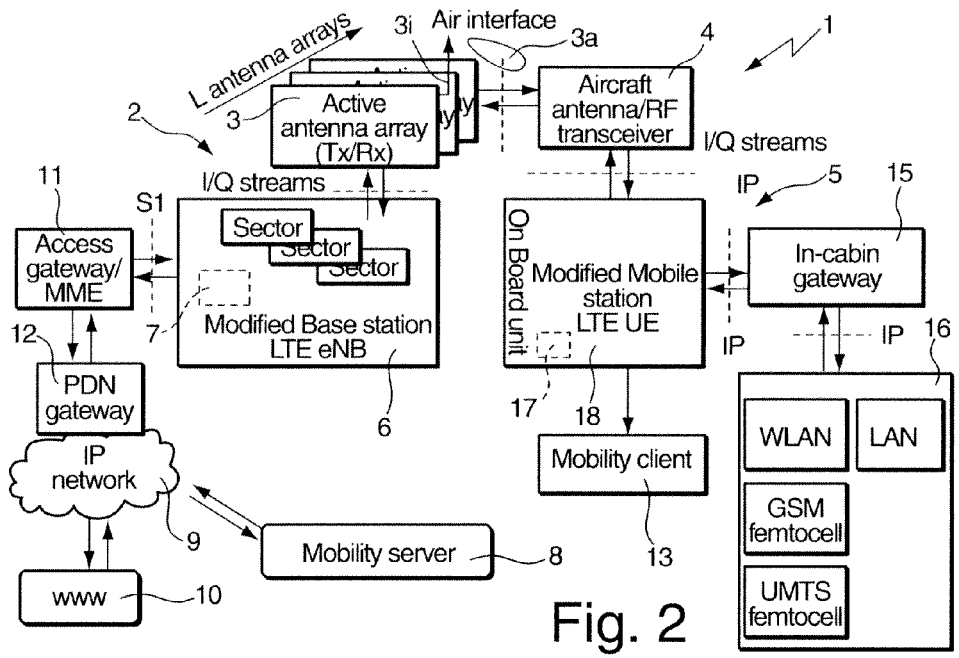
FIG. 2 shows a block diagram of a second embodiment of a communication network according to the invention, not ensuring separability.

In contrast thereto, in the example shown in FIG. 2, the base station 2 and the mobile station 5 are devised as non-separable components, i.e. the beam forming unit 7 is integrated into the LTE eNodeB 6 and the physical layer extension 17 is integrated into the on-board unit 18, which also comprises the LTE UE as processing equipment 14. In the non-separable arrangement shown in FIG. 2, the use of a standardized baseband interface (like the CPRI) may be dispensed with.

Although the above examples have been given for standardized base station and mobile station equipment in accordance with the LTE communication standard, those skilled in the art will readily appreciate that equipment of base stations and mobile stations in accordance with other radio communication standards or even non-standard radio communication systems with known parameters, methods, and processes may be used as well for the system architecture as described herein.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as defined by the appended claims, and equivalents thereof.

The invention claimed is:

1. A method for performing communications in a wireless communication network including a base station and at least one associated respective mobile station, the method comprising:
    receiving mobility information about the at least one associated respective moving mobile station, from a mobility client located at the at least one associated respective moving mobile station, in a mobility server of the wireless communications network, wherein the mobility information includes location information, speed information and direction information of the movement of the moving mobile station; and
    using the mobility information from the mobility server for calculating antenna weights to be applied to antenna elements of an antenna array associated with the base station, for steering a beam generated by the antenna array to the moving mobile station using space-division multiple access (SDMA) and wherein the mobility server predicts a handover event of a moving mobile station to a new target cell of a base station and triggers the steering of a beam of an antenna array of the new target cell to the moving mobile station to be handed over to the new target cell.

2. The method according to claim 1, further comprising:
    transferring the mobility information from a mobility client located at the mobile station to the mobility server.

3. The method according to claim 1, wherein the mobility server uses information about the location of the base stations of the communications network for predicting the handover event.

4. The method according to claim 1, further comprising performing Doppler compensation of signals transmitted between the base station and the moving mobile station.

5. The method according to claim 4 wherein performing Doppler compensation of signals transmitted between the base station and the moving mobile station comprises calculating the Doppler shift based on the mobility information from the mobility client and a position of the base station.

6. The method of claim 1 wherein the wireless communication network comprises:
    a wireless communication network using space-division multiple access (SDMA).

7. A base station for a wireless telecommunication network, comprising:
    a beamforming unit configured to receive mobility information, that originates in at least one associated moving mobile station, about the at least one associated moving mobile station, from an associated mobility server, wherein the mobility information includes location information, speed information and direction information of the movement of the moving mobile station, the beamforming unit being further configured to calculate antenna weights to be applied to antenna elements of an associated antenna array for steering a beam generated by the antenna array to the moving mobile station using the mobility information using space-division multiple access (SDMA) and wherein the associated mobility server predicts a handover event of the moving mobile station to a new target cell of a base station and triggers the steering of a beam of an antenna array of the new target cell to the moving mobile station to be handed over to the new target cell.

8. The base station according to claim 7, wherein the beamforming unit is separable from the base station.

9. The base station according to claim 7, wherein the base station is implemented in a wireless communication network, the wireless network comprising at least one mobile station and a mobility server for storing mobility information about the at least one mobile station, the mobile station comprising a mobility client configured to retrieve mobility information about the mobile station, the mobile station being configured to transfer the mobility information to the base station, the base station being operative to store the mobility information in the mobility server.

10. The base station of claim 9, wherein the mobility server is a centralized server and the base station comprises a connection to the mobility server via a core network of the wireless communication network.

11. The base station of claim 9, wherein the at least one mobile station is arranged in a high-speed vehicle.

12. The base station of claim 11 wherein the high speed vehicle is at least one of a train and an airplane.

13. The base station of claim 7 wherein the mobility server is located in the base station.

14. A mobile station for a wireless communication network, comprising: a mobility client configured to determine mobility information about the moving mobile station, wherein the mobility information includes location information, speed information and direction information of the movement of the moving mobile station, the mobile station being configured to transfer the mobility information to an associated base station of the wireless communication network for storing the mobility information in an associated mobility server, wherein the associated mobility server predicts a handover event of the moving mobile station to a new target cell of a base station and triggers the steering of a beam of an antenna array of the new target cell to the moving mobile station to be handed over to the new target cell.

15. The mobile station according to claim 14, further comprising a physical layer extension component, being configured to perform Doppler compensation of signals transmitted from the mobile station to the base station and/or from the base station to the mobile station.

16. The mobile station of claim 15 wherein the physical layer extension component is arranged at an interface between an RF transceiver of the mobile station and a standardized processing component for processing a baseband signal.

17. The mobile station according to claim 15, wherein the physical layer extension component is separable from the mobile station.

18. A method for performing communications in a wireless communication network, comprising:
transferring mobility information from a plurality of mobility clients located at respective mobile stations of the network to a mobility server arranged at a fixed location in the network, wherein the mobility information of a respective mobile station includes location information, speed information and direction information of the movement of the respective moving mobile station;
storing the mobility information of the plurality of mobile stations in the mobility server; and using the mobility information of the mobility server for predicting a handover event of at least one moving mobile station to a new target cell wherein the mobility server predicts the handover event and triggers the steering of a beam of an antenna array of the new target cell to the moving mobile station to be handed over to the new target cell.

* * * * *